United States Patent [19]

Kosuge et al.

[11] Patent Number: 5,160,718
[45] Date of Patent: Nov. 3, 1992

[54] METHOD OF PRODUCING KENYAITE-TYPE PHYLLOSILICATE

[75] Inventors: Katsunori Kosuge; Atsumu Tsunashima, both of Tsukuba, Japan

[73] Assignee: Director-General of Agency of Industrial Science and Technology, Japan

[21] Appl. No.: 669,093

[22] Filed: Mar. 13, 1991

[30] Foreign Application Priority Data

May 8, 1990 [JP] Japan ................................ 2-118472

[51] Int. Cl.$^5$ .............................................. C01B 33/32
[52] U.S. Cl. ..................................... 423/332; 423/333; 423/334
[58] Field of Search ............... 423/332, 326, 327, 328, 423/330, 331, 333, 334

[56] References Cited

FOREIGN PATENT DOCUMENTS 220586 4/1985 German Democratic Rep. ..................................... 423/332

OTHER PUBLICATIONS

Beneke et al., "Kenyaite-Synthesis and Properties" American Minerologist vol. 68 pp. 818–826 1983.

Primary Examiner—R. Bruce Breneman
Attorney, Agent, or Firm—Lorusso & Loud

[57] ABSTRACT

A kenyaite-type phyllosilicate having a crystallographically single phase is produced by hydrothermally reacting a mixture containing amorphous silica, a sodium compound, a potassium compound and water at a tempeature of 100°–180° C. wherein the mixture has a composition providing the following molar ratios:
  $H_2O/SiO_2$: 15–20,
  sodium compound/$SiO_2$: 0.18–0.30
  potassium compound/$SiO_2$: 0.005–0.30
  sodium compound/potassium compound: 1.1–25.

8 Claims, No Drawings

METHOD OF PRODUCING KENYAITE-TYPE PHYLLOSILICATE

BACKGROUND OF THE INVENTION

This invention relates to a method of producing a kenyaite-type phyllosilicate having a crystallographically single phase and the same layer structure with that of natural kenyaite.

Naturally occurring kenyaite which is a hydrous alkali silicate having the following estimated chemical composition:

$$Na_2Si_{22}O_{41}(OH)_8 \cdot 6H_2O$$

is now utilized as a catalyst, a filler, an absorbent or the like application. Further, because of its layer structure, kenyaite is anticipated to provide a useful, new functional material by modification thereof by intercalation.

Known methods for the chemical synthesis of kenyaite have problems because a very long time is required for performing the kenyaite-forming reaction. Beneke, K. et al (American Mineralogist, 68, 818-826(1983)) report that the reaction of an aqueous suspension containing $SiO_2$ and NaOH at 100°-150° C. gives kenyaite, that the formation of kenyaite at 100° C. requires several months and that the reaction time is much decreased at higher temperatures though quartz forms rapidly under such high temperatures. It is also disclosed that the use of a 1:1 mixture of NaOH and KOH in lieu of NaOH gives a mixture of sodium magadiite and potassium kenyaite.

SUMMARY OF THE INVENTION

It is the prime object of the present invention to provide a method which can yield a kenyaite-type phyllosilicate having a crystallographically single phase and the same layer structure with that of natural kenyaite within a much reduced period of time in comparison with the conventional method.

Another object of the present invention is to provide a method which can produce a kenyaite-type phyllosilicate having a high crystallinity.

It is a further object of the present invention to provide a method of the above-mentioned type in which the reaction resulting in the formation of the phyllosilicate may be performed under a pressure of less than 10 kg/cm².

In accomplishing the foregoing objects, there is provided in accordance with the present invention a method of producing a kenyaite-type phyllosilicate, comprising hydrothermally reacting a mixture containing amorphous silica, a sodium compound, a potassium compound and water at a temperature of 100°-180° C. for a period of time sufficient to form crystallographically single phase phyllosilicate having the same layer structure with kenyaite, said mixture having a composition providing the following molar ratios:
  $H_2O/SiO_2$: 15-20,
  sodium compound/$SiO_2$: 0.18-0.30
  potassium compound/$SiO_2$: 0.005-0.30
  sodium compound/potassium compound: 1.1-25.

The term "kenyaite-type phyllosilicate" used herein is intended to refer to a phyllosilicate having a crystallographically single phase and which has the same layer structure as that of natural kenyaite. The hydrothermal reaction as mentioned above gives kenyaite a portion of the interlayer sodium of which is substituted by potassium. This product may be expressed by the following estimated formula:

$$(Na_{1-x}K_x)_2Si_{22}O_{41}(OH)_8 \cdot 6H_2O$$

where x is a number of greater than 0 but smaller than 1. This product is distinguished from a mere mixture of $Na_{22}Si_{22}O_{41}(OH)_8 \cdot 6H_2O$ with $K_{22}Si_{22}O_{41}(OH)_8 \cdot 6H_2O$ in that the former forms a homogeneous solid solution during the course of the production thereof. The interlayer sodium and/or potassium ions of the product may be replaced by intercalation with other cations. Such modified silicates are also included within the terminology of "kenyaite-type phyllosilicate".

It has been found that when a sodium compound is used by itself rather than in conjunction with a potassium ion, hydrothermal treatment at 150°-170° C. gives magadiite. At 185° C., kenyaite begins forming. It has been found to be necessary to perform the hydrothermal treatment at a temperature of above 200° C. in order to obtain kenyaite of a single crystal phase. This requires a high pressure of far greater than 10 kg/cm².

It has also been revealed that when a potassium compound is used by itself as an alkali metal component, a low crystalline product containing potassium kenyaite and having basal diffraction similar to kenyaite is obtained at a hydrothermal reaction temperature of 150°-180° C. At 185° C., potassium kenyaite of high crystallinity is obtained as a single phase.

It has now been unexpectedly found that when hydrothermal treatment is carried out using sodium and potassium compounds in a specific proportion at such a temperature that magadiite would be produced if the sodium compound is used by itself, kenyaite in which a portion of its sodium is replaced by potassium and which has a crystallographically single phase can be produced within a relatively short period of time.

Other objects, features and advantages of the present invention will become apparent from the detailed description of the preferred embodiments of the invention to follow.

DETAILED DESCRIPTION OF PREFERRED EMBODIMENTS OF THE INVENTION

The method for the production of kenyaite-type phyllosilicate according to the present invention includes a step of hydrothermally reacting a mixture containing amorphous silica, a sodium compound, a potassium compound and water at a temperature of 100°-180° C.

The amorphous silica to be used in the present invention is not specifically limited with respect to an origin from which it is produced or a process by which it is produced. Amorphous silica obtained by a wet method is generally used. Examples of such amorphous silica include those obtained by treating a silicate mineral with a mineral acid, those obtained by treating water glass with an acid and those obtained by hydrolysis of silica alkoxide. Water glass as such may also be utilized as the starting amorphous silica material. The particle size of amorphous silica is not specifically limited. Since large particle size silica requires a long time to be completely dissolved, it is preferred that the amorphous silica have a particle size of about 100 mesh (Tyler) or finer, more preferably 200 mesh or finer.

As the sodium compound to be used in the present invention, a water-soluble sodium compound is suitably used. Examples of suitable sodium compounds include sodium hydroxide and inorganic sodium salts such as sodium carbonate, sodium hydrogencarbonate and sodium chloride.

As the potassium compound to be used in the present invention, a water-soluble potassium compound is suitably used. Examples of suitable potassium compounds include potassium hydroxide and inorganic potassium salts such as potassium carbonate, potassium hydrogencarbonate and potassium chloride.

The proportion of the sodium compound relative to the potassium compound and the proportions of water and these compounds relative to the amorphous silica vary with the kind of the sodium and potassium compounds used. The required and preferred proportions in terms of molar ratio are as follows:

|  | Required | Preferred |
| --- | --- | --- |
| $H_2O/SiO_2$: | 15–20 | 17–19 |
| Na compound/$SiO_2$ | 0.18–0.30 | 0.21–0.25 |
| K compound/$SiO_2$: | 0.005–0.30 | 0.01–0.25 |
| Na compound/K compound: | 1.1–25.0 | 1.1–23.0 |

In the case of a reaction mixture using NaOH and $K_2CO_3$, for example, the following molar ratios are suited:

| $H_2O/SiO_2$: | 17.5–19.0 |
| --- | --- |
| $NaOH/SiO_2$ | 0.22–0.24 |
| $K_2CO_3/SiO_2$: | 0.01–0.25 |
| $NaOH/K_2CO_3$: | 1.2–23.0 |

The hydrothermal reaction should be performed at a temperature of 100°–180° C. A reaction temperature of below 100° C. is disadvantageous because the reaction should be performed for a considerably long period of time. Too high a temperature in excess of 180° C. is also disadvantageous because the hydrothermal reaction should be carried out at a high pressure using a specifically designed reactor and because an impurity phase such as quartz or cristobalite is liable to form. Very good results are obtainable with a reaction temperature of 150°–170° C.

The hydrothermal reaction is performed for a period of time sufficient to obtain a crystallographically single phase phyllosilicate having the same layer structure with kenyaite. The reaction time varies with the reaction temperature and the composition of the reaction mixture is, generally, in the range of 3–200 hours, preferably 10–20 hours. The reaction pressure depends on the reaction temperature and is generally 10 kg/cm² or less.

After completion of the hydrothermal reaction, the reaction mixture is filtered and the solids phase is washed with a dilute aqueous alkali solution such as an aqueous solution containing $10^{-4}$–$10^{-5}$ mol/liter potassium hydroxide or with water, followed by drying. The thus obtained kenyaite having the estimated formula $(Na_{1-x}K_x)_2Si_{22}O_{41}(OH)_8 \cdot 6H_2O$ may be further treated for replacing at least a portion the interlayer cations (K and Na ions) with desired organic or inorganic cations by any known method, if desired.

The synthetic, kenyaite-type phyllosilicate produced according to the present invention has micropores inherent to its specific layer structure and may be utilized in a wide variety of fields such as chemical industry, medical science and ceramic industry. For example, the synthetic silicate may be used as a catalyst carrier, a filler, an absorbent, a deodorizer, an enzyme sensor and a microorganism separator. Further, the silicate modified by intercalation may be used as an enzyme sensor, a microorganism separator, a pharmacologically active substance, a catalyst with an interlayer pillar structure, etc. When the phyllosilicate is treated with an acid, there is obtainable crystalline, laminar polysilicate consisting of silica. This substance may also be utilized in the same applications as amorphous silica.

The following examples will further illustrate the present invention.

EXAMPLE 1

Commercially available amorphous silica, sodium hydroxide, potassium carbonate and water were mixed with each other to form a mixture having $H_2O/SiO_2$ molar ratio of 18, $NaOH/SiO_2$ molar ratio of 0.23 and $K_2CO_3/SiO_2$ molar ratio of 0.16. The mixture was then hydrothermally reacted in an autoclave at 170° C. for 20 hours. The reaction mixture was then filtered and the solids phase was washed with an aqueous potassium hydroxide solution ($10^{-4}$ mol/liter), followed by drying at 40° C. The X-ray diffraction pattern of the thus obtained product was substantially identical with that of natural kenyaite. No change in X-ray diffraction pattern was observed even when the solids phase was washed with water.

EXAMPLE 2

Example 1 was repeated in the same manner as described except that as the commercially available amorphous silica was replaced by amorphous silica obtained by treating serpentinite with an acid and that the hydrothermal reaction was performed for 17 hours. The same results as those in Example 1 were obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing a kenyaite-type phyllosilicate, comprising hydrothermally reacting a mixture containing amorphous silica, sodium hydroxide, potassium carbonate and water at a temperature of 100°–180° C. for 3–48 hours to form crystallographically single phase phyllosilicate having the same layer structure as kenyaite, said mixture having a composition providing the following molar ratios:

$H_2O/SiO_2$: 15–20
   sodium hydroxide [compound]/$SiO_2$: 0.18–0.30
   potassium carbonate [compound]/$SiO_2$: 0.005–0.30
   sodium hydroxide [compound]/potassium carbonate [compound]: 1.1–25.

2. A method as claimed in claim 1, wherein said hydrothermal reaction is performed at a temperature of 150°–170° C.
   and wherein said mixture has a composition providing the following molar ratios:
   $H_2O/SiO_2$: 17–19
   sodium hydroxide [compound]/$SiO_2$: 0.21–0.25
   potassium carbonate [compound]/$SiO_2$: 0.01–0.25
   sodium hydroxide [compound]/potassium carbonate [compound]: 1.1–23.

3. A method as claimed in claim 1, wherein said hydrothermal reaction is performed at a pressure of 10 kg/cm$^2$ or less.

4. A method as claimed in claim 1 wherein the ratio of sodium hydroxide/potassium carbonate is 1.2–23.0.

5. A method as claimed in claim 1 wherein the ratio of sodium hydroxide/potassium carbonate is 1.4–23.0.

6. A method as claimed in claim 2 wherein the ratio of sodium hydroxide/potassium carbonate is 1.2–23.0.

7. A method as claimed in claim 2 wherein the ratio of sodium hydroxide/potassium carbonate is 1.4–23.0.

8. A method as claimed in claim 1 wherein said temperature is 150°–170° C.

* * * * *

UNITED STATES PATENT AND TRADEMARK OFFICE
CERTIFICATE OF CORRECTION

PATENT NO.  : 5,160,718               Page 1 of 2

DATED       : November 3, 1992

INVENTOR(S) : KOSUGE et al

It is certified that error appears in the above-identified patent and that said Letters Patent is hereby corrected as shown below:

Col. 2, line 8, delete "$Na_{22}$" and insert --$Na_2$--; and line 8, delete "$K_{22}$" and insert --$K_2$--.

Col. 4, line 55, delete "[compound]";

line 56, delete "[compound]";

line 57, delete "[compound]";

line 58, delete "[compound]";

line 65, delete "[compound]";

line 66, delete "[compound]";

line 67, delete "[compound]"; and

UNITED STATES PATENT AND TRADEMARK OFFICE
CERTIFICATE OF CORRECTION

PATENT NO. : 5,160,718

DATED : November 3, 1992

INVENTOR(S) : KOSUGE et al

It is certified that error appears in the above-identified patent and that said Letters Patent is hereby corrected as shown below:

Col. 4, line 68, delete "[compound]".

Signed and Sealed this

Ninth Day of November, 1993

Attest:

BRUCE LEHMAN

Attesting Officer

Commissioner of Patents and Trademarks